INVENTORS
ROBERT G. DEXTER &
BY ROBERT P. BLAKE
Parrott & Rankin
ATTORNEYS

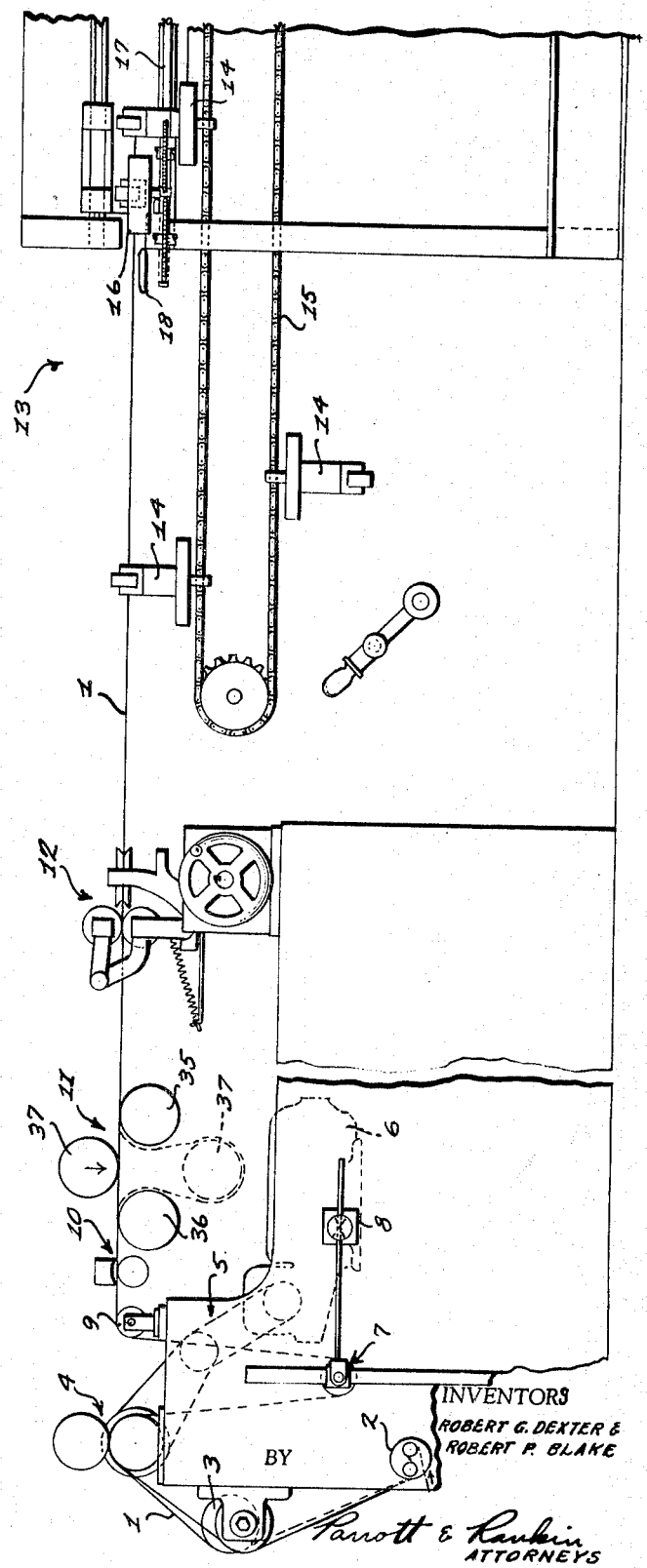

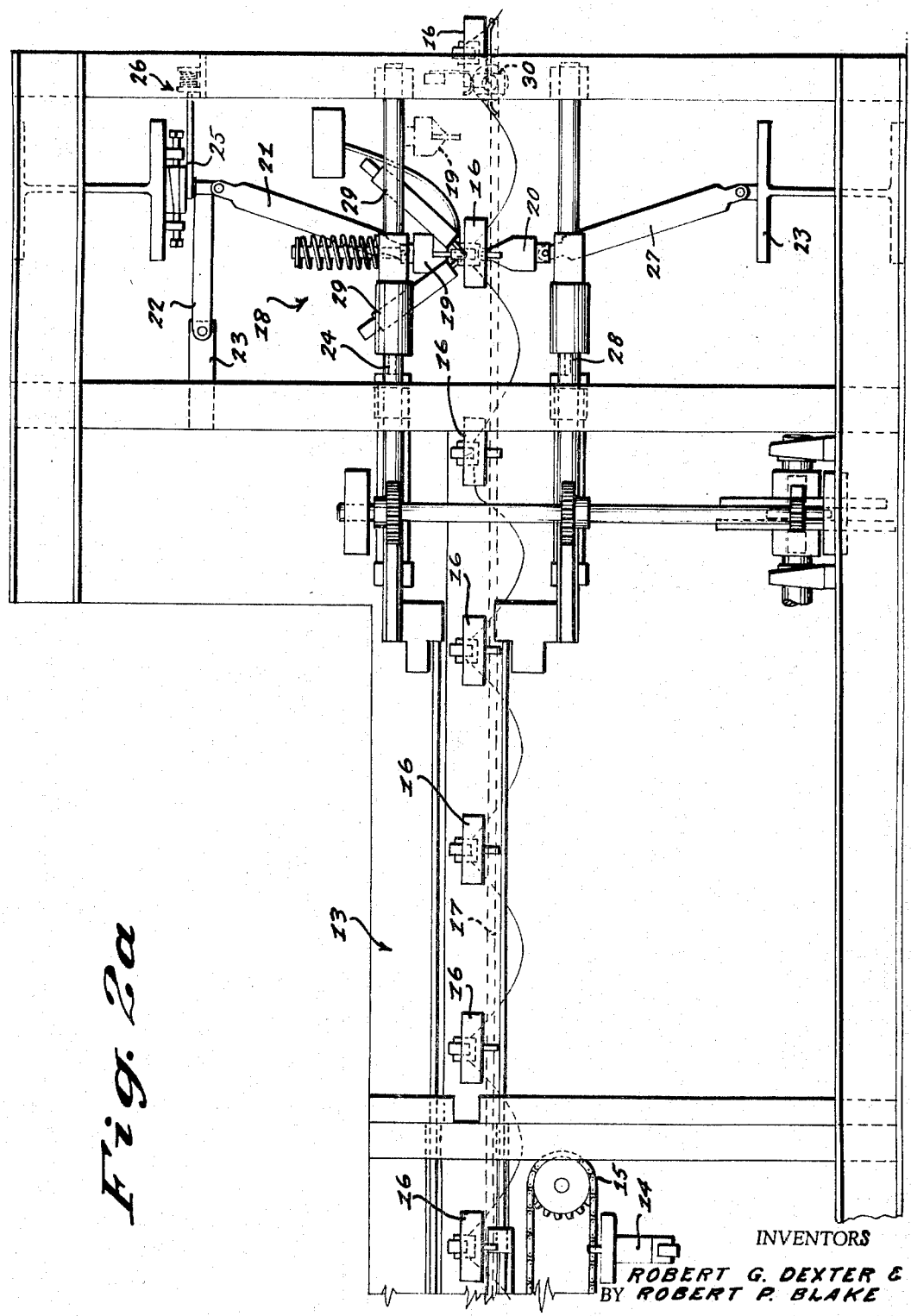

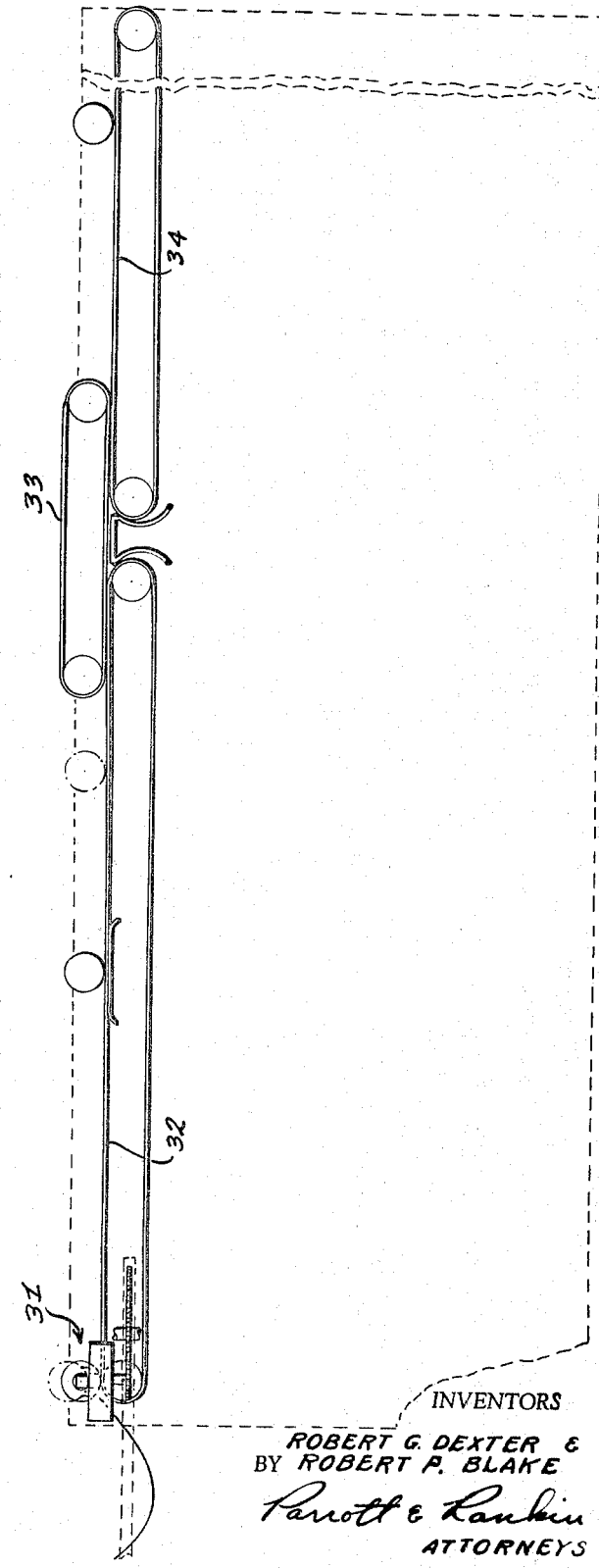

May 23, 1967

R. G. DEXTER ET AL 3,320,925

MECHANISM FOR AUTOMATICALLY CUTTING
AND PROCESSING A TEXTILE WEB

Filed Dec. 31, 1963

INVENTORS
ROBERT G. DEXTER &
BY ROBERT P. BLAKE

Parrott & Rankin
ATTORNEYS 3,320,925
MECHANISM FOR AUTOMATICALLY CUTTING AND PROCESSING A TEXTILE WEB
Robert G. Dexter, Harvard, and Robert P. Blake, Winchester, Mass., assignors, by mesne assignments, to Riegel Textile Corporation, New York, N.Y., a corporation of New York
Filed Dec. 31, 1963, Ser. No. 334,780
7 Claims. (Cl. 118—6)

This invention relates to a mechanism for automatically cutting and processing a textile web and more particularly to a mechanism which will automatically produce individually cut textile products with ravel resistant edges from a continuous web of textile material.

In the automatic manufacture of diapers, towels, bath cloths, dish towels and other cut textile products, various problems arose. Among these problems were feeding and straightening the web, presenting the web of material to the cutter mechanism at the proper time, properly cutting the web into individual cut lengths, preventing raveling along the cut edges, and properly stacking the cut products.

During this automatic manufacturing it is particularly important that the cutting mechanism make a straight, clean cut through the traveling web to sever individually cut pieces from the web and present cut edges which are at 90° to the selvage edge. In the cutting of diapers or the like, for example, it is sometimes desired to cut or pink the traveling web along a pinking or cutting bar of plain weave construction which extends across the width of the web, while the remaining portion of the web may be of a conventional bird's-eye weave or any suitable weave. In attempting to sever the traveling web along the pinking or cutting bar, the problems of presenting the pinking or cutting bar to the cutting mechanism in such a manner that the bar is properly tensioned, straight, and arrives directly at the cutter at the time the cut is to be made can arise. In automatic machines utilizing cutting mechanisms the problem of providing a cutting mechanism which was so constructed so as to make a clean, clear cut through a traveling web of material at the precise point in the web where the cut is to be made arose. When using either an oscillating cutter, a rotating cutter, or a chisel knife it was customary to use merely an anvil consisting of a stationary anvil or a roller or an idler for cooperation with the cutter blade. One of the difficulties encountered in such type of anvils is the eccentricities of the peripheral surface of the anvil and cutter blade. The variations in the peripheral surface of the anvil and cutter blade as a rule are so great as to vary the accuracy of pressure needed to be exerted by the cutter blade in order to cut or sever traveling webs of material passing between such a cutter and anvil. This often results in failure to properly cut or sever light web materials and was often especially conducive to wear and tear because of great pressure needed to accommodate the cutting blade edge to variance in the peripheral surface of the anvil and cutter blade.

In prior times when a traveling web of material was cut or severed for diapers or the like, a problem of raveling of the cut edge was encountered. This problem was fought by subsequent hemming of the cut edges of the diaper. However, this method was not desirable because it required an entirely separate subsequent operation to be performed on the cut edge which was both costly and time consuming and very often the cut edge had already raveled before hemming could be accomplished. Other methods of preventing raveling were tried such as cutting with a pinking blade to produce a pinked cut edge on the diaper. While this was a time saving improvement over the hemming of the cut edge, it was not as ravel resistant as the hemmed edge.

Heretofore, stacking mechanisms have stacked a predetermined number of cut sheets of material in separate, non-contacting stacks. This method of stacking cut sheets required a large conveyor area since each stack required an area of conveyor space equal to its own dimensions. This resulted in very large stacker mechanisms and a waste of space. Shingling or overlapping of the stacks also presented a further problem in that the leading stack of cut sheets on the conveyor was necessarily underneath the stack that followed it because the leading stack was formed first and indexed forward on the conveyor and then the next stack was formed with part of the stack shingled or overlapping the first stack. This presented a problem to the operator when removing the leading stack, since the operator necessarily had to either pull the leading stack out from underneath the stack that followed it or lift the stack that followed for removal of the leading stack. This method of removal sometimes resulted in disturbing the stacks of cut sheets which followed the leading stack being removed.

In accordance with the present invention, marked improvements have been made in overcoming these forgoing difficulties. This invention provides an automatic machine which will effectively feed a web of material from a source of supply, over an expander roller for expanding the web transversely of its length, through a dancer assembly which will take out any longitudinal slack in the web of material and provide the correct tension therein, through a repositioning device, over an edge guide unit for further straightening the web, and to a gripper and sensing assembly.

This gripping and sensing assembly will effectively feed the web of material forward until it senses a cutting or pinking bar in the web of material. The mechanism will then grip the cutting or pinking bar and feed it forward in proper timed relationship to the cutting mechanism. A transverse tension will also be applied to the web by the gripping and sensing mechanism to straighten the cutting bar in the web of material and present it at exactly 90° to each of the selvage edges for proper cutting by the cutting mechanism. Longitudinal tension is released at this point in festooning the traveling web by maintaining the gripping mechanism closer to each other in the longitudinal direction of the web than the length of the web between cutting bars.

The cutting mechanism of this invention consists of an oscillating cutter blade which is so arranged and pivoted as to oscillate along an arcuate path above the traveling web of material. The arcuate path of the cutter blade has a low point slightly below the level of the traveling web of material, and it is at this point that the material is cut. Associated with this oscillating cutter blade is an oscillating anvil which is so arranged and pivoted as to also oscillate along an arcuate path below the traveling web of material concurrently with the cutter blade. The arcuate path of the anvil has a high point slightly above the level of the traveling web of material and it is at this point that the material is cut. The arcuate path of travel of the cutter blade and anvil member intersect each other near the respective high and low points so that the traveling web will be squeezed between the cutter blade and anvil at that point and sufficient pressure will exist between the cutter blade and the anvil to effectively cut or sever the traveling web of material, regardless of the bulk thereof. Provision is made to raise the pivot point of the cutter blade on its return stroke to effect raising of its arcuate path of travel to prevent intersecting of the arcuate paths of travel on the return stroke of the cutter blade and anvil and thereby prevent cutting of the web on the return stroke.

The anvil of this invention comprises a rubber backed anvil, including an anvil block having a solid rubber cushioning member therein and a striker plate covering the solid rubber member. The rubber backed anvil of this invention overcomes the aforementioned difficulties by presenting a surface to the cutter blade which will conform to variations in the cutting surface of the cutting blade and thereby distribute equal pressure along the entire cutting surface. The solid rubber member will fill the cavity in the block which holds it when pressure is exerted on it by the cutter blade to effectively present a solid non-resilient surface to the cutter blade which will maintain the pressure between the cutter blade and anvil necessary to cut or sever a traveling web of material regardless of the bulk of the material, but which will conform to the eccentricities or variations in the peripheral surface of the cutter blade. This type of anvil is also highly advantageous in increasing the life of the cutter blade.

This invention overcomes the difficulties in preventing the cut edge of the textile piece from raveling. It provides means for depositing minute amounts of ravel resistant chemical at spaced points adjacent the cut edge of the textile pieces simultaneously with the cutting of the web. This may be accomplished by providing anti-ravel chemical applicators which are secured on either side of the cutter blade and adapted to travel therewith. When cutting is effected, these applicators are so located on each side of the cutter blade that drops of anti-ravel chemical with contact the cut textile products at each of the cut edges and flow into the material by wicking or absorbing action simultaneously with the cutting of the web to provide spaced deposits of the anti-ravel chemical along the cut edges of the diapers to prevent raveling thereof after the diaper is cut.

Following cutting, this machine provides means to feed the individually cut textile products forward away from the cutting mechanism and onto an inspection conveyor system, where the automatically produced diapers, towels or the like may be inspected.

This invention provides a stacker mechanism following the inspection conveyor system which will overcome the aforementioned difficulties. The stacker mechanism will stack the cut products in separate stacks of a predetermined number which will overlap each other or are shingled together and thereby conserve space. The stacker mechanism also provides for conveying the shingled stacks through an angle of 180 degrees to reverse the overlapping to present the leading stack on the top of the stack which follows for easy removal by an operator.

Further features of this invention will be understood from a consideration of the following more detailed description taken in conjunction with the accompanying drawings, in which.

Figure 1:
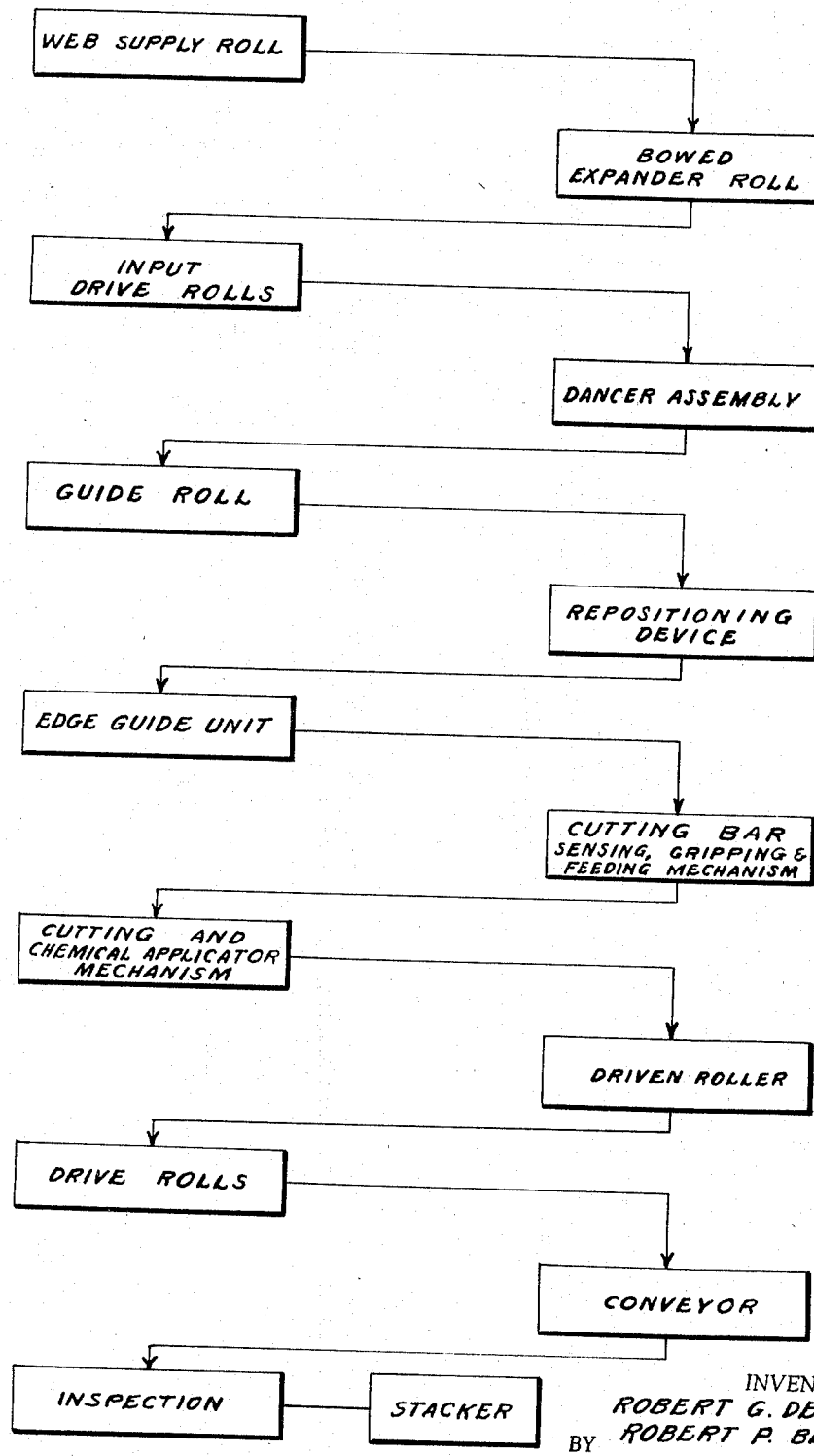
FIG. 1 is a flow sheet diagram showing the mechanisms of this invention.

According to this invention a web of material 1 is led from a web supply roll 2 over a bowed expander roll 3. This expander roll 3 spreads out the continuous web of material for its forward progress in the machine. The web 1 then passes through driven input rolls 4. The driven input rolls 4 are driven by a belt and pulley arrangement 5 which is driven by a variable speed motor 6. The variable speed motor 6 is controlled by a dancer mechanism 7. This conventional dancer mechanism takes out any longitudinal slack in the web of material and provides the correct tension therein. Its vertical position controls a rheostat 8 which in turn controls the variable speed motor 6 and thereby controls the speed of the web relative to the amount of longitudinal slack in the traveling web. The web 1 then passes over a guide roll 9, through clamp 10 and then through repositioning device 11. The clamp 10 and repositioning device 11 will be described in detail later. The web 1 then passes through a conventional self centering edge guide unit 12 with pneumatic edge sensing mechanisms for straightening the web and guiding it properly through the machine.

Figure 2C:
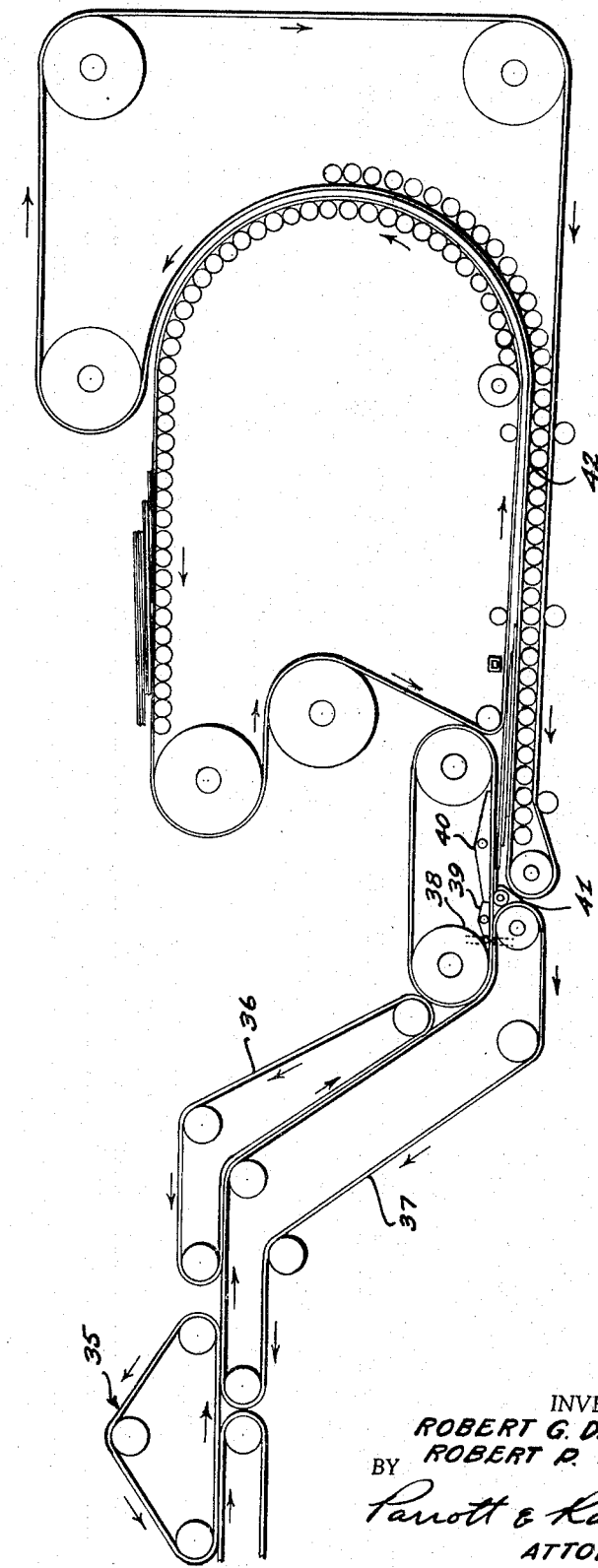
FIG. 2 is a diagrammatic side elevation view of the first section of this invention.
FIG. 2a is a diagrammatic side elevation view and constitutes a continuation of FIGURE 2.
FIG. 2b is a diagrammatic side elevation view of this invention and constitutes a continuation of FIG. 2a, and FIG. 2c is a diagrammatic side elevation view of this invention and constitutes a continuation of FIG. 2b.

From the edge guide unit 12 the web 1 travels to the web gripping and feeding mechanisms generally indicated by the reference numeral 13. In the web gripping and feeding mechanisms 13 the web of material is gripped by a series of pairs of auxiliary grippers 14 along the longitudinal edges thereof. There auxiliary grippers 14 are disposed on an endless chain 15 and feed the web forward. As the web is being pulled forward by the auxiliary grippers 14 a series of pairs of main grippers 16 secured to another endless chain 17 begin following the auxiliary grippers on each longitudinal edge of the web in an unclamped position at a speed less than the travel of the web and the auxiliary grippers. Cooperating with the main grippers and traveling therewith are photocells 18 disposed adjacent each longitudinal edge of the web 1 and adapted to sense the cutting bar or pinking bar as it passes over the photocell to actuate the mean grippers on that edge of the web. The photocells 18 are arranged by any suitable means to reciprocate at the same speed as the main grippers and are so timed that they will follow each main gripper in their forward stroke. The main grippers 16 are so constructed that they will grip the cutting bar on each side of the bar. If the bar is being fed by the auxiliary grippers 14, crooked or otherwise, the main grippers 16 of each pair on each longitudinal edge will not grip the web until the cutting bar has passed over the photocell 18 traveling with each gripper. Therefore, the cutting bar when it has been gripped with both main grippers of a pair will be straight and fed in a position that is 90° to the path of travel of the web. When the main grippers 16 have gripped the web 1 the auxiliary grippers 14 are released and the web 1 is fed forward by the main grippers alone. The longitudinal tension in the traveling web 1 is released by maintaining the pairs of main grippers 16 closer to each other in the longitudinal direction of the traveling web than the distance between cutting bars, thereby providing festooning in the traveling web, as shown in FIG. 2a. The main grippers 16 which are now feeding the material are arranged to ride along a cam which will cam the grippers outwardly and thereby furnish a tranverse tension in the gripped cutting bar for proper cutting of the web.

The web gripping and feeding mechanisms are more specifically disclosed and claimed in our co-pending application Ser. No. 334,700, filed Dec. 31, 1963, now U.S. Patent No. 3,246,816, issued Apr. 19, 1966, and reference may be had to that application for a more specific description.

Cooperating with the web gripping and feeding mechanisms is a repositioning device 11 and clamp 10. If the photocells 18 have not sensed a cutting bar in their forward stroke they will act to stop the entire operation of the machine and close clamp 10 on the web and activate repositioning device 11 through any suitable electrical circuit. The repositioning device 11 comprises stationary rollers 35 and 36 and vertically moving roller 37. When the machine has been cut off and clamp 10 has closed to prevent any additional length of the web 1 to be pulled from the supply roll 2, the horizontally moving roller 37 will move downwardly by any suitable mechanism in the direction of the arrow in FIG. 2 to the dotted line position of that figure. This will pull the continuous web 1 back through the gripping and feeding mechanism 13.

The clamp 10 will now be released and the above described operation of the gripping and feeding mechanism 13 including the sensing mechanism 18 will begin again to attempt sense and grip the cutting bar on each longitudinal edge. This operation will repeat until the cutting bar has been sensed and gripped.

The web of material 1 is now being led to the cutting and anti-ravel chemical applicator mechanisms represented generally by the reference numeral 18. The cutting mechanism includes a cutting member 19 and a trapped rubber anvil 20. The cutter toggle member 21 is pivoted to a lever arm 22 which is pivoted to the stationary machine frame 23. The cutter member 19 and the cutter toggle member 21 are oscillated back and forth in an arcuate path by a cutter drive rod 24. The forward position of the cutter member 19 is represented in phantom in FIGURE 2a. For positioning the cutter member 19 there is provided a spacer block 25 connected to a pneumatic cylinder and piston 26. The spacer block 25 is maintained in the position illustrated in FIG. 2a for the forward stroke of the arcuate path of the cutting member 19 to enable the cutting member to cut the web 1 on the forward stroke. However, on the return stroke it is not desirable to cut the web 1 because the cutter will be moving in a direction opposite to that of the traveling web 1. Therefore, the pneumatic cylinder and piston 26 will be actuated by any convenient means to move the spacer block 25 to the right. This will allow the cutter member 19 to move upwardly to follow a higher path on the return stroke and thereby avoid contact with the traveling web 1 and eliminate cutting of the web on this return stroke.

The cooperating trapped rubber anvil member 20 is pivoted to an anvil toggle member 27. The anvil toggle member 27 is pivoted to the machine frame 23. The anvil member 20 and the anvil toggle 27 are oscillated back and forth in an arcuate path by an anvil drive rod 28 and associated mechanisms. The arcuate path of the anvil member 20 is the same in both the forward and return strokes.

In operation the cutter member 19 and the anvil member 20 will be oscillated back and forth in their forward and return strokes in unison. The arcuate path of the cutter member 19 will intersect the arcuate path of the anvil member 20 in the forward stroke at the respective high and low points of the arcuate paths. When this intersection occurs, the web 1 will be cut or severed. The trapped rubber anvil member 20 will present a surface to the cutter member which will conform to any variations in the cutting surface of the cutter blade and will evenly distribute the pressure between the cutter member 19 and the anvil member 20 which occurs during cutting of the web 1 due to the intersecting of the arcuate paths. Sufficient pressure is maintained between these two members during this cutting or severing action to cut the web of material 1 regardless of the bulk of the material being used. On the return stroke of the cutter member 19 and the anvil member 20, the pneumatic piston and cylinder 26 will be actuated to move the spacer block 25 to the right. This will cause the cutter member 19 to be moved upwardly and the cutter member will now traverse a path in the return stroke which will not intersect the arcuate path of the anvil member 20 and therefore will not cut the web 1 in the return stroke.

Associated with the cutting mechanism are anti-ravel chemical applicators 29. These applicators 29 are secured to each side of the cutter member 19 and contain a supply of anti-ravel chemical therein. In operation, the anti-ravel chemical applicators are so arranged as to travel with the cutter member 19 in the cutting strokes thereof. When the arcuate path of the cutter member 19 intersects the arcuate path of the anvil member 20 to cut the web 1, the anti-ravel chemical applicators 29 will apply a plurality of spaced dots of anti-ravel chemical simultaneously with the cutting of the web along each of the cut edges in the web of material and thereby prevent any raveling in the web of material which might occur after cutting.

The cutting and anti-ravel chemical applicator mechanisms are more specifically disclosed and claimed in our copending application Ser. No. 339,836, filed Dec. 31, 1963, and reference may be had to that application for a more specific description.

Following the cutting of the web 1 into individually cut pieces, these pieces are still being held by main grippers 16 and are passed over a driven roller 30. This driven roller 30 keeps any festooning which may occur in the web 1 after it has been cut from interfering with the arcuate paths of the cutter or anvil member. The individually cut pieces of the web 1 are then laid to a conveyor system by driven input rolls 31. At this time the main grippers 16 are released and the individually cut pieces of the web 1 are carried by the driven input rolls 31 alone. The driven input rolls 31 deposit the individually cut pieces on an entrance conveyor belt 32. The entrance conveyor belt 32 is traveling faster than the individually cut pieces of the web 1 were traveling heretofore and will space each individually cut piece from the others for entrance to the inspection conveyor. The individually cut pieces of the web 1 are then transferred from the entrance conveyor 32 by an intermediate conveyor 33 to the inspection conveyor 34. The individually cut pieces such as diapers, towels or the like may now be inspected on the inspection conveyor 34 by an operator.

Following this inspection the individually cut pieces are transferred to the stacker mechanism by a vacuum transfer 35. The cut sheets are then conveyed by conveyors 36 and 37 to the main stacker device where a photocell 38 actuates suction mechanisms 39, 40, and 41 to stack a predetermined number of cut products in a stack. The photocell 38 also actuates the conveyor 42 on which the stacks are made to index this conveyor forward a distance less than the length of the stack of cut sheets, so that another stack may be made which overlaps or shingles the first stack. The stacks are indexed by conveyor 42 through an angle of 180° to invert the shingling or overlapping, so that an operator may easily remove the leading stack from the mechanism.

The stacker mechanism is more specifically disclosed and claimed in our copending application Ser. No. 335,320, filed Jan. 2, 1964, now U.S. Patent No. 3,243,182, issued Mar. 29, 1966, and reference may be had to that application for a more specific description.

This invention is not intended to be limited by the foregoing description or otherwise except as defined in the appended claims.

We claim:

1. A mechanism for automatically cutting and processing a textile web comprising input means for feeding a continuous web of material having a cutting bar therein from a source of supply, means for sensing the cutting bar in the traveling web of material, means actuated by said sensing means for gripping the traveling web of material at the cutting bar, for straightening the cutting bar, and for feeding the web forward, means for cutting the traveling web of material at the cutting bar as the bar is being fed by said gripping means, and means for applying anti-ravel chemical along the cut edge of the textile web to prevent raveling therein.

2. A mechanism for automatically cutting and processing a textile web, as set out in claim 1, in which, said means for applying anti-ravel chemical is adapted to travel with said cutting means to apply the anti-ravel chemical to the web simultaneously with the cutting of the web to prevent raveling at the cut edge.

3. A mechanism for automatically cutting and processing a textile web, as set out in claim 1, in which, said said means for gripping, straightening, and feeding the cutting bar in the traveling web comprises a series of pairs of auxiliary grippers adapted to grip the traveling web of material on each longitudinal edge thereof and feed the web forward and a series of pairs of main grippers adapted to follow said auxiliary grippers in an unclamped position, said main grippers being actuated by said sensing means to clamp the web at the cutting bar on each longitudinal edge thereof when the sensing means senses the cutting bar in the web.

4. A mechanism for automatically cutting and processing a textile web, as set forth in claim 1, including means for stacking the individually cut pieces in shingled stacks and means for conveying the shingled stacks through an angle of 180°.

5. A mechanism for automatically cutting and processing a textile web, as set forth in claim 1, including an inspection conveyor for conveying the individually cut pieces from the cutter mechanism for inspection and removal by an operator.

6. A mechanism for automatically cutting and processing a textile web, as set out in claim 1, in which, said cutting means comprises a cutter member adapted to oscillate back and forth in the direction of travel of the web in an arcuate path and a trapped rubber anvil member adapted to oscillate back and forth simultaneously with the cutter member in an arcuate path which intersects the arcuate path of said cutter member in the forward stroke thereof to cut the web.

7. A mechanism for automatically cutting and processing a textile web, as set out in claim 6, in which, said means for applying anti-ravel chemical is adapted to travel with said cutter member to apply the anti-ravel chemical to the web simultaneously with the cutting of the web to prevent raveling at the cut edge.

References Cited by the Examiner

UNITED STATES PATENTS

| | | | |
|---|---|---|---|
| 1,368,933 | 2/1921 | Hutchingson | 118—38 |
| 2,229,638 | 1/1941 | Chamberlin et al. | 83—88 |
| 2,277,846 | 3/1942 | Couch | 271—70 |
| 2,966,086 | 12/1960 | Sjostrom | 83—365 |
| 3,121,018 | 2/1964 | Wood et al. | 117—4 |
| 3,177,746 | 4/1965 | Langer | 83—422 |
| 3,182,536 | 5/1965 | Sumpter et al. | 83—418 |

ALFRED L. LEAVITT, *Primary Examiner.*

A. M. GRIMALDI, *Examiner.*